UNITED STATES PATENT OFFICE.

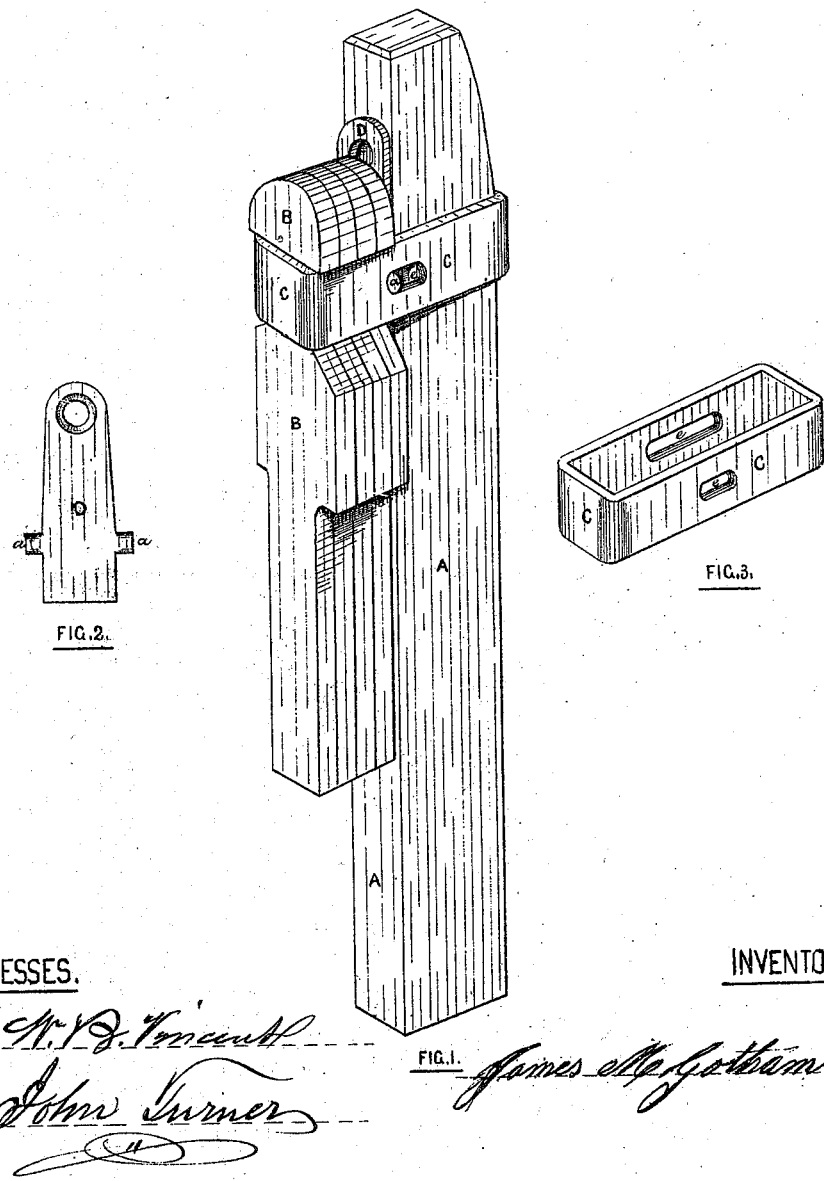

JAMES M. GOTHAM, OF BLACKSTONE, MASSACHUSETTS, ASSIGNOR TO HIMSELF AND LEWIS DEVLIN, OF CENTRAL FALLS, RHODE ISLAND.

IMPROVEMENT IN PICKER-COLLARS.

Specification forming part of Letters Patent No. 107,772, dated September 7, 1870.

*To all whom it may concern:*

Be it known that I, JAMES M. GOTHAM, of Blackstone, in the State of Massachusetts, have invented a new and Improved Picker-Collar; and I do hereby declare that the following specification, taken in connection with the drawings making a part of the same, is a full, clear, and exact description thereof.

Figure 1 is a perspective view of the collar, picker, and staff. Fig. 2 is a view of the wedge D. Fig. 3 is a perspective view of the collar.

My invention consists in the manner of binding together the pieces of leather forming the picker, and the attachment of the same to the picker-staff, and has for its object facility of adjustment and economy of material and labor in its manufacture.

Taking into consideration the variety of pickers now in the market, it would be impossible to notice in this specification the peculiarities of each, and by comparison show the superiority of my own. I shall therefore only briefly describe the picker now in most common use, which is made of several pieces of leather fastened together by nails, and attached to the staff by a leather strap, which is fastened together with a rivet. In pickers made in this way the ends of the nails which hold the pieces of leather together are driven against the picker-staff with each blow of the picker with sufficient force to wear away the wood and render a new staff necessary. The strap which holds the picker to the staff, being liable to both break and stretch, occasions much loss of time and a considerable consumption of material.

In my invention I make use of a malleable-iron collar, as hereinafter described, which not only holds the picker to the staff, but at the same time binds together the pieces of leather forming the picker. The advantages derived by this arrangement over ordinary pickers are the saving in the material and labor and the preservation of the picker-staff. I dispense with all nails and the labor of fastening together the pieces of leather therewith, and construct the picker and collar as follows:

A, Fig. 1, is the picker-staff, B the picker, and C the collar. The picker B is composed of pieces of leather commonly used for such purposes, placed within the collar C, and held firmly together at one end of the same by the wedge D, the other end being free to receive the picker-staff.

In pickers where the pieces of leather are fastened by rivets or otherwise, when the first pieces become worn out, the whole picker is thrown away; but in pickers attached with my improved collar the pieces that are worn out only are removed and others substituted in their place.

I construct the collar C, as shown in Fig. 3, with two slots, E and E', which receive the ears $a$ and $a'$ of the wedge D and hold it in place, one of the slots being longer than the other, so that the wedge may be easily adjusted.

What I claim as my invention, and desire to secure by Letters Patent, is—

The metal collar C, with the slots $e$, in combination with the wedge D, having the ears $a$, all constructed and operating together as described, and for the purposes specified.

JAMES M. GOTHAM.

Witnesses:
   W. B. VINCENT,
   JOHN TURNER.